US012718679B2

(12) United States Patent
Kaufman

(10) Patent No.: US 12,718,679 B2
(45) Date of Patent: Aug. 25, 2026

(54) EMERGENCY VEHICLE ALERTS

(71) Applicant: Aisin World Corp. of America, Northville, MI (US)

(72) Inventor: Larrow Kaufman, Los Angeles, CA (US)

(73) Assignee: AISIN WORLD CORP. OF AMERICA, Northville, MI (US)

( * ) Notice: Subject to any disclaimer, the term of this patent is extended or adjusted under 35 U.S.C. 154(b) by 3 days.

(21) Appl. No.: 18/738,126

(22) Filed: Jun. 10, 2024

(65) Prior Publication Data

US 2025/0378749 A1 Dec. 11, 2025

(51) Int. Cl.
*G08B 21/18* (2006.01)
*H04W 4/40* (2018.01)

(52) U.S. Cl.
CPC .............. *G08B 21/18* (2013.01); *H04W 4/40* (2018.02)

(58) Field of Classification Search
None
See application file for complete search history.

(56) References Cited

U.S. PATENT DOCUMENTS 5,307,060 A * 4/1994 Prevulsky ............ G08G 1/0965 340/901
6,529,831 B1 3/2003 Smith et al.
6,958,707 B1 * 10/2005 Siegel .................... G08G 1/087 340/902
7,099,776 B2 8/2006 King et al.
7,161,485 B2 1/2007 Melman
7,446,674 B2 11/2008 McKenna
7,515,065 B1 4/2009 Bygrave et al.
7,525,447 B2 * 4/2009 Galindo ............... G08G 1/0965 340/901
8,223,037 B2 7/2012 Grotendorst et al.
10,127,813 B2 11/2018 Walsh et al.
10,147,318 B2 12/2018 Gebers
10,284,317 B1 5/2019 Sanchez et al.
10,531,224 B1 1/2020 Lemieux
10,600,326 B2 * 3/2020 Kim ......................... G08G 5/55
10,762,779 B1 * 9/2020 Mundy ............ G08G 1/096791
11,758,354 B2 9/2023 Whelen
12,101,387 B2 * 9/2024 MacGabann ........ H04M 3/5116
2004/0189490 A1 * 9/2004 Halishak .............. G08G 1/0965 340/902
2004/0246144 A1 * 12/2004 Siegel .................. G08G 1/0965 340/902

(Continued)

FOREIGN PATENT DOCUMENTS

WO 2023159260 A1 8/2023

OTHER PUBLICATIONS

HAAS Alert, "HAAS Alert Safety Cloud," Retrieved from the Internet: <https://www.haasalert.com/>, retrieved Apr. 30, 2024, 8 pages.

*Primary Examiner* — Muhammad Adnan
(74) *Attorney, Agent, or Firm* — Sughrue Mion, PLLC

(57) ABSTRACT

Systems, methods, and other embodiments described herein relate to improving alerts for emergency vehicles. In one embodiment, a method includes, responsive to detecting, using an electronic device, an alert signal from a nearby vehicle, determining one or more characteristics of the nearby vehicle from at least the alert signal. The method further includes providing an alert according to the one or more characteristics.

19 Claims, 4 Drawing Sheets

(56) References Cited

U.S. PATENT DOCUMENTS

| | | | | |
|---|---|---|---|---|
| 2006/0176190 | A1* | 8/2006 | Madison | B60Q 1/52 340/425.5 |
| 2008/0074286 | A1* | 3/2008 | Gill | G08G 1/0965 340/902 |
| 2008/0106435 | A1* | 5/2008 | Kirkpatrick | G08G 1/0965 340/902 |
| 2009/0119014 | A1* | 5/2009 | Caplan | G01S 19/51 342/357.34 |
| 2012/0038489 | A1* | 2/2012 | Goldshmidt | G08G 1/166 340/902 |
| 2013/0049985 | A1* | 2/2013 | Eisenson | G08G 1/0965 340/902 |
| 2014/0051346 | A1* | 2/2014 | Li | H04W 4/046 455/3.01 |
| 2015/0371539 | A1* | 12/2015 | Hawkins, Sr. | G08G 1/096791 340/902 |
| 2016/0193961 | A1 | 7/2016 | Fischer et al. | |
| 2016/0210858 | A1* | 7/2016 | Foster | G08G 1/0965 |
| 2016/0240084 | A1* | 8/2016 | Takeuchi | B60T 7/22 |
| 2018/0005524 | A1* | 1/2018 | Kildevaeld | G08G 1/0965 |
| 2019/0027032 | A1* | 1/2019 | Arunachalam | G08G 1/0965 |
| 2019/0236945 | A1 | 8/2019 | Ye et al. | |
| 2019/0236947 | A1 | 8/2019 | Wood | |
| 2020/0098253 | A1* | 3/2020 | Zeplin | G08G 1/087 |
| 2020/0152058 | A1* | 5/2020 | Edwards | G08G 1/0965 |
| 2020/0202470 | A1* | 6/2020 | Graham | G16H 40/67 |
| 2020/0216025 | A1* | 7/2020 | Le Bourgeois | B60R 25/241 |
| 2020/0404612 | A1* | 12/2020 | Murphy | H04W 4/023 |
| 2021/0248907 | A1* | 8/2021 | Chodorski | G08B 5/36 |
| 2022/0044562 | A1 | 2/2022 | Schaak | |
| 2022/0048529 | A1* | 2/2022 | Ding | B60W 60/001 |
| 2022/0148423 | A1 | 5/2022 | Asakura | |
| 2022/0322085 | A1* | 10/2022 | De Vegt | G07C 9/00309 |
| 2022/0351617 | A1* | 11/2022 | Sullivan | G08G 1/087 |
| 2023/0138369 | A1* | 5/2023 | Watkins | H04W 4/90 340/902 |
| 2023/0298465 | A1* | 9/2023 | Walsh | G08G 1/0965 340/902 |
| 2024/0046789 | A1* | 2/2024 | Lewing | H04W 4/46 |
| 2024/0221501 | A1* | 7/2024 | Keshek | G08G 1/087 |
| 2025/0299573 | A1* | 9/2025 | Villicana | B60W 50/14 |
| 2025/0316169 | A1* | 10/2025 | M Iyengar | G08G 1/096758 |

* cited by examiner

EMERGENCY VEHICLE ALERTS

TECHNICAL FIELD

The subject matter described herein relates in general to systems and methods for alerts about emergency vehicles and, more particularly, to providing alerts for approaching emergency vehicles to improve awareness.

BACKGROUND

The ability of emergency vehicles to freely move along roadways can be critical in responding to an emergency situation. Whether the situation involves a fire/EMS vehicle racing to a residential emergency, police pursuing a criminal, or another emergency, the ability to avoid traffic and navigate along roadways is important in effectively responding to emergencies. Moreover, because of the urgency of most emergency situations, the rate of speed at which the emergency vehicle is traveling can be heightened, thereby increasing risks to the safety of both the emergency responders and others who are present on the roadway.

Effectively notifying other vehicles and pedestrians is generally limited to the use of audible emergency sirens and lights mounted on the emergency vehicles. These modalities of alerting others have many limitations. For example, while sirens are loud, they are nevertheless limited in range and the ability to penetrate into closed vehicles that may block noise. Moreover, the sirens may be muted by traffic noise, ambient noises (e.g., construction), music played within vehicles, music or other sounds within headphones of pedestrians, and other sources of noise pollution. Similarly, the effectiveness of emergency lights can also be dulled when drivers are distracted, traffic and other obstacles occlude the emergency vehicle, lighting conditions obscure the emergency vehicle, and so on. As a result, road users may not be aware of the approaching emergency vehicle and can hinder the progress of the emergency vehicle or even perform actions that directly interfere with the progress of the emergency vehicle. As such, the existing modalities of alerting drivers and pedestrians can be inadequate.

SUMMARY

Example systems and methods associated with improving alerts for emergency vehicles are disclosed. As previously noted, the effectiveness of alert devices, such as sirens and lights, on emergency vehicles can be limited. Environmental and user-based factors can degrade how well or whether a driver/pedestrian hears or sees the alerts at all. That is, in an environment such as a roadway, many different factors exist that impact the propagation and reception of sound and light. Existing noise from other vehicles, construction, music, and so on can interfere with the ability of a person to perceive sounds from sirens. Moreover, distractions, occlusions, and other factors can further hinder the perceptions of sirens and emergency lights. Therefore, promptly notifying road users about approaching emergency vehicles remains a difficult task.

However, in one or more arrangements, a disclosed approach improves alerting road users about the presence of an emergency vehicle by leveraging wireless communications to provide information about the emergency vehicle. For example, an emergency vehicle, in one configuration, includes a wireless transmitter. The wireless transmitter may be configured according to various protocols but generally broadcasts an alert signal at a distance that is sufficient to provide enough time for other road users to take action. The distance can vary depending on the particular implementation but may range from about one mile to about one thousand feet. The alert signal may include various information within a payload included therein. For example, the payload can be a simple indicator about the presence of the emergency vehicle or may include additional information, such as a location (e.g., GPS location), a type of vehicle, a route, and so on.

In any case, the emergency vehicle broadcasts the wireless alert signal in order to inform road users (e.g., pedestrians, vehicles, etc.) about the presence of the emergency vehicle. A receiving device may vary in form depending on the particular use. That is, the receiving device that includes the wireless receiver for acquiring the alert signal may be implemented within a vehicle, within a mobile device (e.g., a mobile phone, a smartphone), or within another electronic device. As such, the receiving electronic device monitors for alert signals and, upon receiving and identifying an alert signal, determines characteristics of the emergency vehicle therefrom. As previously noted, in a basic form, the alert signal simply indicates the presence of the emergency vehicle within a defined distance that is a transmission range. In this instance, the receiving electronic device is made aware of the presence of the emergency vehicle via the alert signal from which the electronic device can then provide an alert (e.g., within the vehicle), or the device may perform additional functions prior to generating an alert in order to, for example, determine whether an alert is appropriate or not.

As previously described, the alert signal may also include additional information about the characteristics of the emergency vehicle that can facilitate the additional functions of the electronic device. For example, the additional functions can involve determining a direction from which the emergency vehicle is approaching, whether the emergency vehicle is likely to pass within a defined distance of the electronic device, whether the emergency vehicle will affect the progress of the electronic device, etc. Accordingly, where the alert signal includes a location, a route, etc., the electronic device can use this information to facilitate the additional functions. However, the electronic device may also acquire sensor data from, for example, the detecting vehicle in which the electronic device is integrated/present to perform the additional functions. The sensor data can include audio from a microphone, camera images, point clouds from LiDAR scans, data from other vehicles with which the detecting vehicle is wirelessly communicating, and so on. The device can use this information, alone or in combination with the characteristics from the alert signal, to localize the emergency vehicle in the environment and otherwise assess whether the emergency vehicle is likely to pass proximate to the electronic device.

The electronic device may acquire the alert signal from the emergency vehicle in many circumstances in which the emergency vehicle may not pass proximate to the electronic device, such as when the emergency vehicle is driving on an overpass, when the emergency vehicle is on an opposite side of a divided highway, when the emergency vehicle is on a parallel roadway, such as an access road, and so on. Therefore, in at least one arrangement, instead of automatically generating an alert, the electronic device determines the likelihood that the emergency vehicle will actually affect the electronic device (e.g., a detecting vehicle). The device may use the likelihood, which can be defined as an approach/passing distance, to compare against an approach threshold defining a minimum distance at which the emergency vehicle may pass before impacting the device (e.g., whether the emergency vehicle will pass on the same roadway or not and within the noted distance).

The electronic device may then generate an alert to inform a user about the approaching emergency vehicle. The alert may take different forms but can include using haptics, audio, and visual indicators. For example, the electronic device may generate the alert as an audible message within the detecting vehicle that specifies the emergency vehicle is approaching. In further examples, the alert can include further information, such as a direction of approach, a time until the emergency vehicle will be passing, and so on. The alert may be visually presented via a message on a display, a graphic within a map, and/or through other modalities, including haptics within a seat, and so on. In this way, the present approach is able to improve awareness about the emergency vehicle, thereby improving safety while also facilitating the progress of the emergency vehicle itself.

In one or more arrangements, a detection system is disclosed. The detection system includes one or more processors and a memory that is communicably coupled to the one or more processors. The memory stores a detection module including instructions that when executed by the one or more processors cause the one or more processors to, responsive to detecting, using an electronic device, an alert signal from a nearby vehicle, determine one or more characteristics of the nearby vehicle from at least the alert signal. The memory further stores an alert module including instructions that when executed by the one or more processors cause the one or more processors to provide an alert according to the one or more characteristics.

In one or more arrangements, a non-transitory computer-readable medium is disclosed. The non-transitory computer-readable medium includes instructions thereon that, when executed by one or more processes, cause the one or more processors to, responsive to detecting, using an electronic device, an alert signal from a nearby vehicle, determine one or more characteristics of the nearby vehicle from at least the alert signal. The instructions further include instructions to provide an alert according to the one or more characteristics.

In one or more arrangements, a method is disclosed. The method may include, responsive to detecting, using an electronic device, an alert signal from a nearby vehicle, determining one or more characteristics of the nearby vehicle from at least the alert signal. The method further includes providing an alert according to the one or more characteristics.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
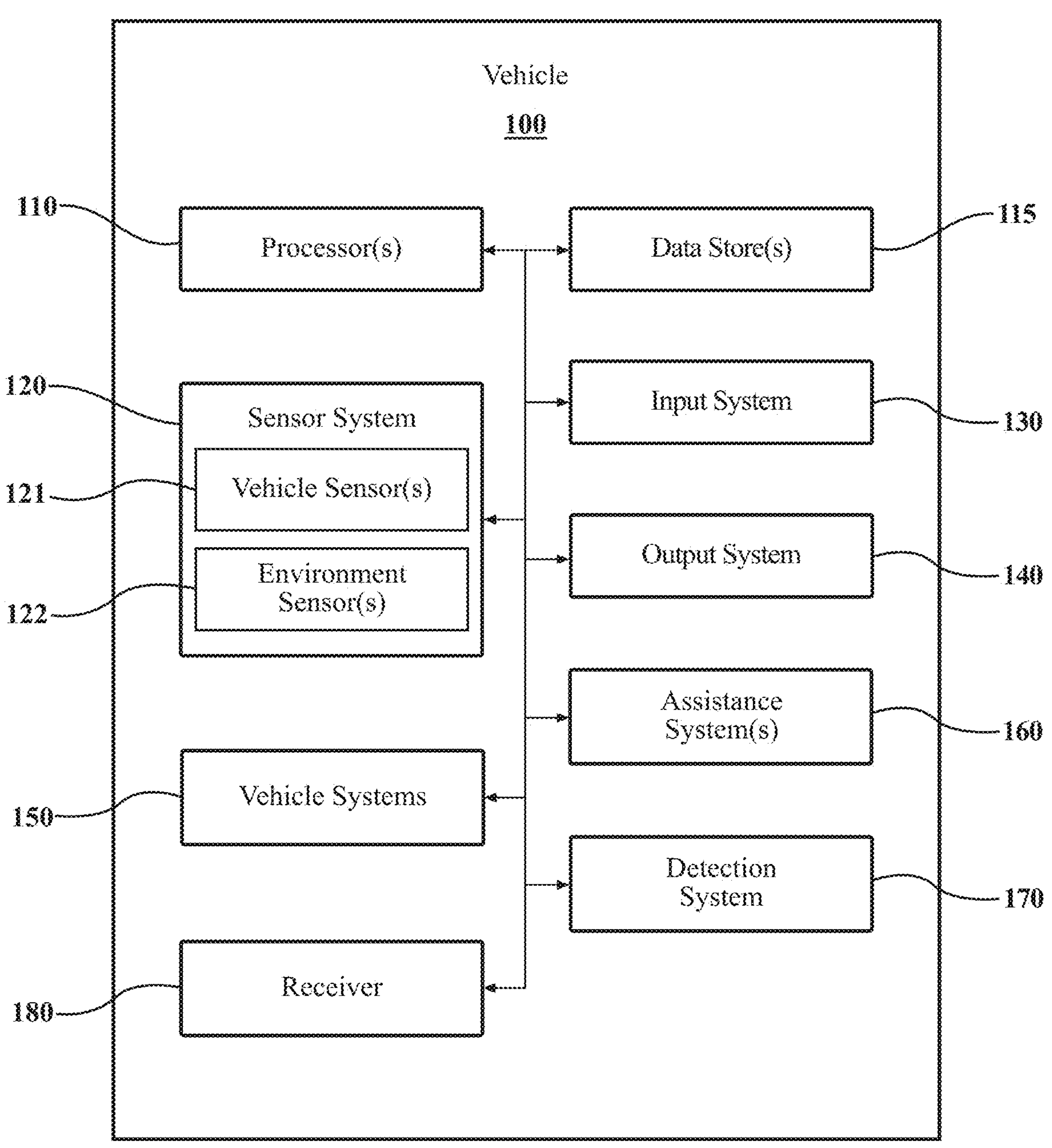
FIG. 1 illustrates one embodiment of a vehicle in which example systems and methods disclosed herein may operate.

Systems, methods, and other embodiments associated with improving alerts for emergency vehicles are disclosed. As previously noted, the effectiveness of alert devices, such as sirens and lights, on emergency vehicles can be limited. Environmental and user-based factors can degrade how well or whether a driver/pedestrian hears or sees the alerts. That is, in an environment, such as a roadway, many different factors exist that impact the propagation and reception of sound and light. Existing noise from other vehicles, construction, music, and so on can interfere with the ability of a person to perceive the sirens. Moreover, distractions, occlusions, and other factors can further hinder the perceptions of sirens and emergency lights. Therefore, promptly notifying road users about approaching emergency vehicles remains a difficult task.

However, in one or more arrangements, a disclosed approach improves alerting road users about the presence of an emergency vehicle by leveraging wireless communications to provide information about the emergency vehicle. For example, an emergency vehicle, in one configuration, includes a wireless transmitter. The wireless transmitter may be configured according to various different protocols (e.g., 2.4 GHz Bluetooth low energy (BLE), dedicated short-range communications (DSRC), etc.) but generally broadcasts an alert signal at a distance that is sufficient to provide enough time for other road users to take action. The distance can vary depending on the particular implementation but may range from about one mile to one thousand feet. The alert signal itself may include various information within a payload included therein. For example, the payload can be a simple indicator about the presence of the emergency vehicle (e.g., within the transmission range) or may include additional information, such as a location (e.g., GPS location), a type of vehicle, a route, and so on.

In any case, the emergency vehicle broadcasts the wireless alert signal in order to inform road users (e.g., pedestrians, vehicles, etc.) about the presence of the emergency vehicle. Thus, in general, a receiving device may vary in form depending on the particular user. That is, the receiving device, which includes the wireless receiver for acquiring the alert signal, may be implemented within a vehicle, within a mobile device (e.g., a smartphone), or within another electronic device. The robust set of devices in which the receiver and associated logic may be implemented provide for protecting different types of road users (e.g., pedestrians, bicyclists, vehicles, etc.).

The receiving electronic device monitors for alert signals and, upon receiving and identifying an alert signal, determines the characteristics of the emergency vehicle therefrom. As previously noted, in a basic form, the alert signal simply indicates the presence of the emergency vehicle within a defined distance that is a transmission range. In this instance, the receiving electronic device is made aware of the presence of the emergency vehicle via the alert signal from which the electronic device can then provide an alert (e.g., within the vehicle) or the device may perform additional functions prior to generating an alert in order to, for example, determine whether an alert is appropriate or not.

The alert signal may also include additional information about characteristics of the emergency vehicle that can facilitate the additional functions of the electronic device and includes further intrinsic information in the form of the received alert signal itself (e.g., a signal strength). For example, the additional functions can involve determining a direction from which the emergency vehicle is approaching, determining a distance, determining whether the emergency vehicle is likely to pass within a defined distance of the electronic device or otherwise affect the progress of the electronic device, and so on. Accordingly, in instances in which the alert signal includes a location, a route, etc. the electronic device can use this information and/or other available information (e.g., signal strength) to facilitate the additional functions. However, the electronic device may also acquire sensor data from, for example, the detecting vehicle or other device in which the electronic device is integrated/present to perform the additional functions. The sensor data can include audio from a microphone, camera images, point clouds from LiDAR scans, data from other vehicles with which the detecting vehicle is wirelessly communicating, and so on. The device can use this information, alone or in combination with the characteristics from the alert signal, to localize the emergency vehicle in the environment and otherwise assess whether the emergency vehicle is likely to pass proximate to the electronic device.

For example, the electronic device may acquire the alert signal from the emergency vehicle in many circumstances in which the emergency vehicle may not pass proximate to the electronic device, such as when the emergency vehicle is driving on an overpass, when the emergency vehicle is on an opposite side of a divided highway, when the emergency vehicle is on a parallel roadway, such as an access road, and so on. Therefore, in at least one arrangement, instead of automatically generating an alert, the electronic device determines the likelihood that the emergency vehicle will actually affect the electronic device (e.g., a detecting vehicle). The device may use the likelihood, which can be defined as a passing distance, to compare against an approach threshold defining a minimum distance at which the emergency vehicle may pass before impacting the device (e.g., whether the emergency vehicle will pass on the same roadway or not).

The electronic device may then generate an alert to inform a user about the approaching emergency vehicle. The alert may take different forms but can include using haptics, audio, and visual indicators. For example, the electronic device may generate the alert as an audible message within the detecting vehicle that specifies the emergency vehicle is approaching. In further examples, the alert can include further information, such as a direction of approach, a time until the emergency vehicle will be passing, and so on. The alert may be visually presented via a message on a display, a graphic within a map, haptics within a seat or steering wheel, and so on. In this way, the present approach is able to improve awareness about the emergency vehicle, thereby improving safety while also facilitating progress of the emergency vehicle itself.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that facilitates providing alerts to road users and thus benefits from the functionality discussed herein. For example, the vehicle 100 may instead be a mobile device (e.g., a smartphone), a smartwatch, etc.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a detection system 170 that functions to improve awareness about the presence of emergency vehicles by, in at least one approach, selectively generating alerts. Moreover, while depicted as a standalone component, in one or more embodiments, the detection system 170 is integrated with the assistance system 160, or another similar system of the vehicle 100 as a sub-component thereof. The noted functions and methods will become more apparent with a further discussion of the figures.

Figure 2:
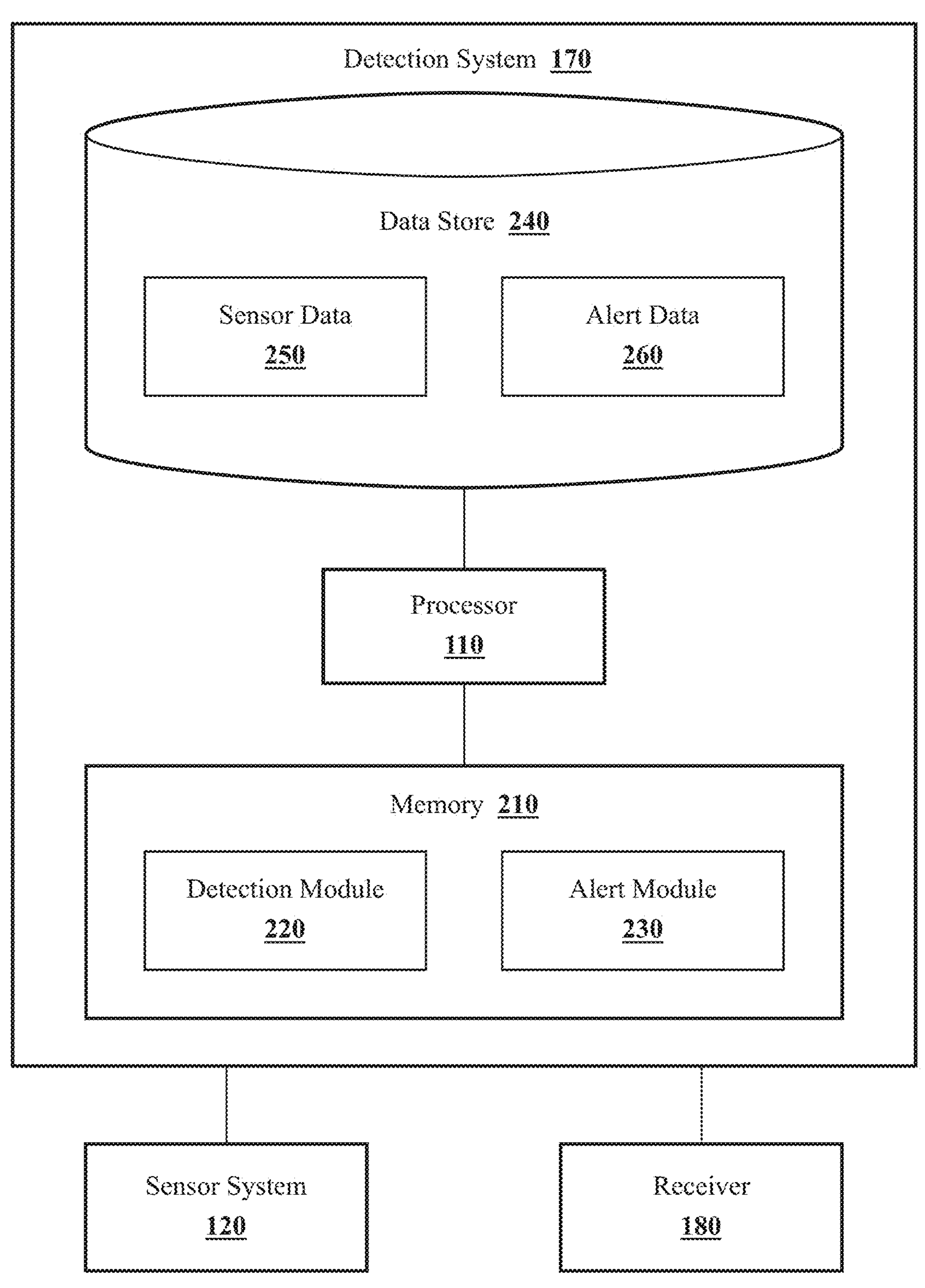
FIG. 2 illustrates one embodiment of a detection system that is associated with improving alerts for emergency vehicles.

With reference to FIG. 2, one embodiment of the detection system 170 is further illustrated. As shown, the detection system 170 includes a processor 110. Accordingly, the processor 110 may be a part of the detection system 170, or the detection system 170 may access the processor 110 through a data bus or another communication pathway. In one or more embodiments, the processor 110 is an application-specific integrated circuit that is configured to implement functions associated with a detection module 220 and an alert module 230. More generally, in one or more aspects, the processor 110 is an electronic processor, such as a microprocessor, that is capable of performing various functions as described herein when executing encoded functions associated with the detection system 170. In various arrangements, the processor 110 may be an electronic control unit (ECU) of the vehicle 100 that executes one or more processes, including, for example, onboard diagnostics (OBD) or other functions. Accordingly, the processor 110 may execute the functions of the modules 220/230 as a separate thread and/or in combination with logic of the other processes.

In one embodiment, the detection system 170 includes a memory 210 that stores the detection module 220 and the alert module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etcetera for independently performing one or more of the noted functions.

Furthermore, in one embodiment, the detection system 170 includes a data store 240. The data store 240 is, in one embodiment, an electronically-based data structure for storing information. In one approach, the data store 240 is a database that is stored in the memory 210 or another suitable storage medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250 along with, for example, other information that is used by the modules 220 and 230, such as alert data 260 from a received alert signal.

Accordingly, the detection module 220 generally includes instructions that function to control the processor 110 to acquire data inputs from one or more sensors (e.g., a camera, radar, lidar, microphone, etc.) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc., that may be present in the lanes, proximate to a roadway, within a parking lot, garage structure, driveway, or another area within which the vehicle 100 is operating.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

Thus, whether the sensor data 250 is derived from a single sensor or multiple sensors, the sensor data 250 is comprised of information about a surrounding environment from which the detection system 170 can derive determinations about a current context (e.g., traffic, obstacles, etc.) and the presence of an emergency vehicle. Of course, as previously noted, the detection system 170 may or may not use additional information, such as the sensor data 250, in making determinations about the emergency vehicle, as the sensor data 250 may not be available in all configurations.

In any case, the detection module 220 includes instructions to at least receive and identify alert signals from which the alert data 260 can be derived. To receive the alert signals, the detection module 220 interfaces with a receiver 180. The receiver 180 is a radio receiver that receives wireless radio signals via an antenna. A radio transmitter of the emergency vehicle transmits the radio signals at a defined frequency or set of defined frequencies. In one example, the radio signals have a frequency of 2.4 GHz. In further examples, the radio frequency may be different, such as 5.9 GHz or another suitable frequency or combination of frequencies for providing wireless communication signals over distances of about 1000 feet to one mile. In general, the transmitter and the receiver 180 function according to a defined protocol (e.g., IEEE 802.15, IEEE 802.11p, etc.).

As such, the transmitter encodes the alert signal according to a protocol. In at least one arrangement, the transmitter of the emergency vehicle encodes the alert signal to include a basic indicator of the presence of an emergency vehicle. For example, the alert signal may include a header and a payload where the header indicates a source identifier (e.g., a network address or secure identifier), and the payload may simply indicate an emergency vehicle is approaching. In various formats, the message itself, without an explicit payload may indicate the presence of the emergency vehicle. The alert signal may include security information to prevent spoofing, such as a digital certificate, signature or other secure indicator that the detection system 170 can otherwise validate. In further arrangements, the emergency vehicle may encode the alert signal to include a more robust set of information. As a non-limiting list of additional information that the emergency vehicle may integrate with the alert signal, the alert signal can include a type of the nearby vehicle, a location of the nearby vehicle, a destination of the nearby vehicle, a speed, and other information indicative of a current condition and purpose. The type of the emergency vehicle may provide insights about a safety impact of the emergency vehicle and whether the user should proactively move to permit the emergency vehicle to pass. The type may specify one of: an ambulance, a police vehicle, a fire vehicle, and a military vehicle.

In any case, the emergency vehicle wirelessly transmits the alert signal, which may automatically begin when an operator of the emergency vehicle activates sirens/lights, a route to an emergency is initiated, an operator explicitly provides an input to begin transmitting the alert signal, or another predetermined condition occurs for initiation of the transmission. Once activated, associated logic (e.g., a client instance of the detection system 170) that is present in the emergency vehicle generates and transmits the alert signal. The emergency vehicle, in at least one arrangement, transmits the alert signal at a predefined repeating interval. As one example, the emergency vehicle transmits the signal every 1.0 seconds. In this way, the alert signal is iteratively transmitted as the emergency vehicle progresses along a route to inform road users.

Accordingly, the detection module 220 includes instructions to monitor for alert signals. In particular, the detection module 220, in at least one configuration, actively monitors the radio frequency or frequencies on which the alert signal is broadcast. When the detection module 220 detects the reception of a signal via the receiver 180 according to a buffer value changing, a memory flag being asserted, an interrupt, or another construct indicating the presence of a signal, the detection module 220 indicates the reception of the signal and proceeds to identify the signal. That is, the detection module 220 may parse the received signal to determine that the signal is an alert signal. The detection module 220 may identify the alert signal according to a defined format, the presence of one or more security identifiers (e.g., a certificate), or another identifying element that is a part of the alert signal. It should be appreciated that the detection module 220 may undertake various security measures to confirm the alert signal is valid, such as verifying a digital signature, verifying a message authentication code, verifying a digital certificate, and so on.

Figure 3:
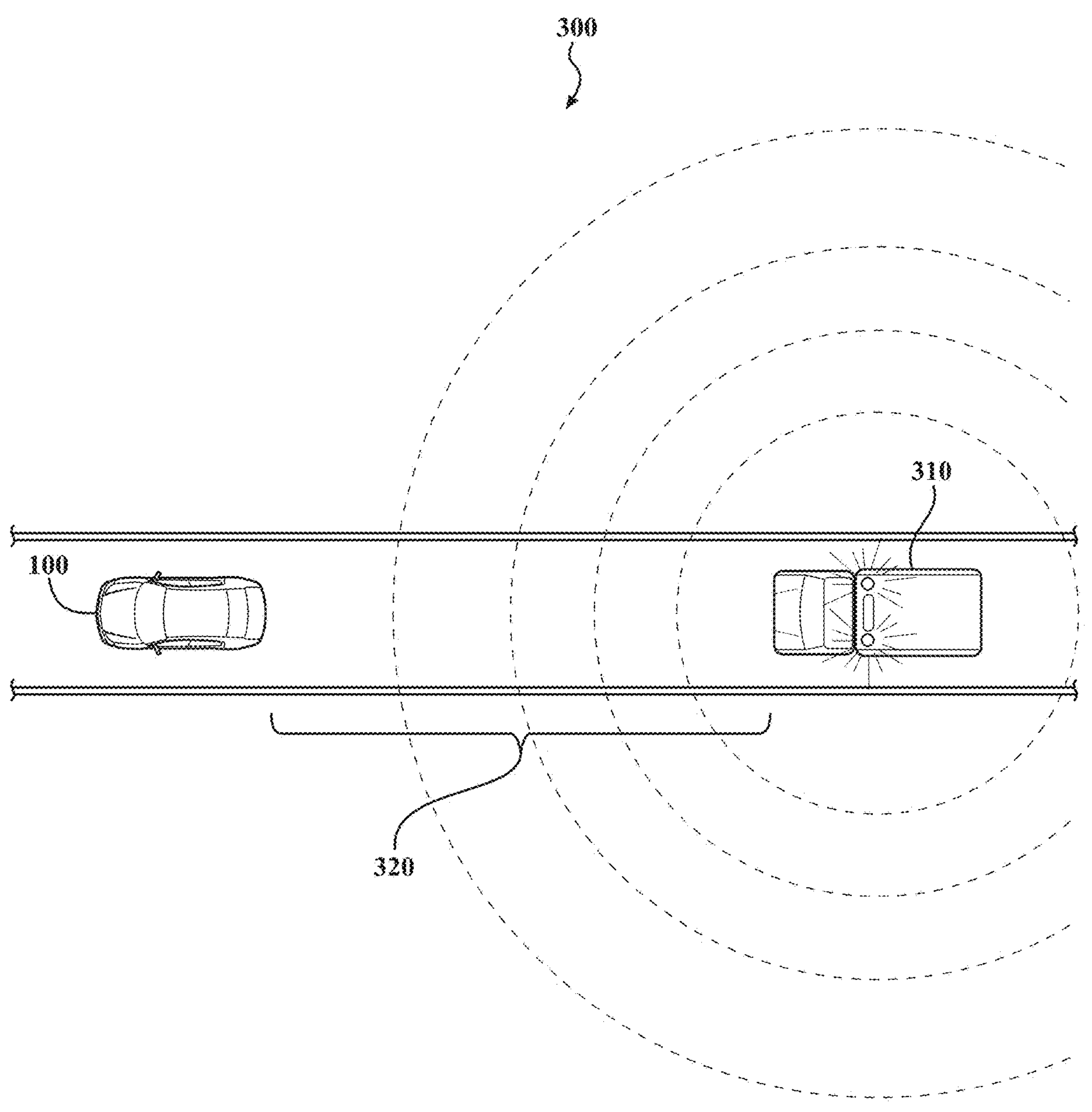
FIG. 3 illustrates one example scenario of an emergency vehicle approaching a vehicle that includes the described system.

With reference to FIG. 3, one example road scenario 300 is illustrated. As shown in FIG. 3, the vehicle 100 is traveling along a roadway with an emergency vehicle 310 approaching from behind. The emergency vehicle 310 is broadcasting an alert signal within a defined transmission range, as represented by the set of concentric circles. Accordingly, as a distance 320 between the emergency vehicle 310 and the detecting vehicle 100 reaches the transmission range of the transmitter in the emergency vehicle 310, the detection system 170 of the vehicle 100 receives the alert signal.

Responsive to detecting the alert signal, the detection module 220 extracts the alert data 260 and proceeds to determine the characteristics of the emergency vehicle 310 (also referred to as a nearby vehicle herein). The detection module 220 may determine the characteristics from the alert data 260 derived from the alert signal and/or from the sensor data 250. Determining the characteristics from the alert signal can include extracting information from the payload (e.g., GPS location, heading, speed, route, vehicle type, etc.) and/or analyzing the alert signal itself. Analyzing the alert signal may include determining a signal strength indicator (SSI), analyzing the alert signal for multi-path effects, and so on. The SSI may provide information about a distance of the emergency vehicle 310 when, for example, the initial transmission power and other information (e.g., weather conditions) are known.

Separately, the detection module 220 can determine one or more of the characteristics from the sensor data 250, which provides perceptions about the surrounding environment including nearby vehicles, such as an approaching emergency vehicle. The detection module 220 may perform localization on the emergency vehicle and other objects in the surrounding environment, which is a process of determining the location of the emergency vehicle in the environment either absolutely according to established coordinates or relative to the vehicle 100. Thus, the detection module 220 may use audio from a microphone, camera images, and other information to determine at least a relative location (e.g., direction and distance). In further arrangements, the detection module 220 may determine a precise location of the emergency vehicle when information, such as GPS data, camera images, LiDAR data, or other such data is available.

It should be appreciated that the detection module 220, in various arrangements, further detects other aspects of the surrounding environment. The detection module 220 may detect aspects about environmental conditions (e.g., the traffic, weather, etc.), roadway, and so on. These detections may be derived from existing functionality of autonomous systems of the vehicle 100 when the vehicle can operate autonomously, functionality of advanced driving assistance systems (ADAS), or from separate sensors provided for the detection system 170. Accordingly, the processing of the sensor data 250 can include different sets of algorithms depending on the implementation. In one or more approaches, the detection module 220 implements deep neural networks (DNNs), such as convolutional neural networks (CNNs), transformer networks, and so on, to process the sensor data 250 and/or the alert data 260 into the characteristics about the emergency vehicle and/or other aspects of the surrounding environment.

Continuing with the discussion of FIG. 2, the alert module 230 uses the information collected and generated by the detection module 220 to determine whether to provide an alert or not. As described previously, the implementation of the detection system 170 may be undertaken at different levels. Thus, in a basic form, the alert module 220 automatically generates the alert simply based on reception of the alert signal without further determinations concerning circumstances of the current context. As may be appreciated, delivering the alert in this way can lead to instances in which the alert is delivered, but the emergency vehicle does not end up crossing a path or directly approaching the vehicle 100.

Therefore, in further arrangements, the alert module 230 selectively generates the alert according to whether the emergency vehicle satisfies an approach threshold. The approach threshold indicates whether the emergency vehicle will have an effect on movement of the vehicle 100 in the environment. For example, affecting the movement of the vehicle 100 includes delaying the vehicle 100, causing the vehicle 100 to change a trajectory (e.g., pull to the side of the roadway), causing the vehicle to stop so that the emergency vehicle can pass, and so on. In general, the detection system 170 is able to quantify this effect by determining the likelihood of the emergency vehicle passing within a defined distance or set of distances. That is, when the emergency vehicle is to pass the vehicle 100 from a rear position, as shown in FIG. 3, the likelihood of affecting the vehicle 100 because the vehicle 100 will need to pull over or perform another maneuver to permit the emergency vehicle to pass is high. Similarly, when the emergency vehicle crosses a path of the vehicle 100 at an intersection, the effect is similarly high due to delay (e.g., emergency control of a stop light) and/or a necessary adjustment in a trajectory of the vehicle 100 to permit the emergency vehicle to proceed.

In an instance where the detection system 170 is instead implemented within a mobile device (e.g., a mobile phone) that may be used by a pedestrian, similar situations persist and may further include direct impacts on the safety of the pedestrian where the pedestrian may need to move away from the roadway in order to maintain adequate safety, refrain from crossing a street, and so on. In any case, the alert module 230, in one approach, computes a path of the emergency vehicle according to the characteristics. From the predicted path, the alert module 230 can then determine a likelihood of the path intersecting with the vehicle 100. That is, because the path of the vehicle 100 or simply a general location of the vehicle 100 is known and the predicted path of the emergency vehicle 100 can be computed, the detection system 170 can determine a distance at which the emergency vehicle is likely to pass/intersect with the vehicle 100. This includes whether the emergency vehicle is on the same road or an intersecting road, thereby identifying whether the emergency vehicle is on a parallel road, an overpass, or another segment of road that is not directly connected with or at least associated with traffic on the road of the vehicle 100. Accordingly, the determination of the likelihood includes, in one or more arrangements, determining whether the emergency vehicle is on an associated roadway with the vehicle 100 and whether the approach distance is within a defined approach threshold.

In regards to the approach threshold, the approach threshold defines a distance within which the emergency vehicle is to pass the vehicle 100. It should be appreciated that even in an example such as FIG. 3, the emergency vehicle may turn onto a side road or simply stop before ever reaching the vehicle 100. Thus, the detection module 220 may define the approach threshold in order to ensure that the emergency vehicle will actually approach the vehicle 100. In one example, the approach threshold is defined as 100 feet. In further examples, the approach threshold may differ and can also depend on the way in which the emergency vehicle approaches the vehicle 100. For example, if the emergency vehicle is approaching the vehicle 100 via an intersecting roadway (i.e., a roadway that crosses the roadway of the vehicle 100 via a controlled intersection), then the approach threshold is defined as a greater distance (e.g., 500 feet) in order to provide the vehicle 100 time for performing appropriate actions to avoid the emergency vehicle (e.g., not proceeding through an intersection). In still a further approach, the detection system 170 may implement the alert module 230 with one or more deep neural networks that process the corpus of information (e.g., the sensor data 250, the alert data 260, etc.) and provide a determination about the likelihood. In any case, the alert module 220 assesses the emergency vehicle in relation to the vehicle 100 in order to determine whether to generate the alert or not.

Additionally, it should be appreciated that the determination of the path may not be exact in all circumstances. For example, depending on the fidelity of the available information, the determination may be a rudimentary assumption that the path will progress along a current road from a direction in which the emergency vehicle has been detected. That is, where explicit route data or GPS location information is not available, the alert module 230 may undertake assumptions in the determination of the path, such as that the emergency vehicle is presently on the same roadway as the vehicle 100 and is progressing toward the vehicle 100. In this way, the alert module 230 still ensures that the user is aware of the presence of the emergency vehicle, even when an exact path can not be determined. Even still, the alert module 230, in one configuration, can still provide additional information to the user, such as iteratively determining a distance of the emergency vehicle, which may be based on audio data from a microphone and/or SSI information from the alert signal itself. The alert module 230, in one approach, iteratively determines the distance and may alter the presentation of the alert accordingly, as will be described further subsequently.

This basic approach is in contrast to a determination with a higher confidence in which the route is known or otherwise predicted with a high degree of certainty, and the alert module 230 can then more accurately predict the path and the approach distance. That is, when the detection system 170 acquires high-fidelity information that is provided via the alert signal itself and/or sensors from the vehicle 100, then detection system 170 is better able to determine the likelihood. As such, in this instance, the alert module 230 is also better able to assess whether or not to deliver the alert to the user, which may reduce alert fatigue and facilitate better informing the user. In any case, when the likelihood satisfies the approach threshold, the alert module 230 proceeds to generate the alert.

The alert module 230 provides the alert by generating the alert as one or more of: a visual indicator within a display associated with the electronic device, an audible indicator, a haptic indicator, etc. The different ways in which the alert module 230 can generate the alert are only limited by the available modalities of the generating device. In the context of a vehicle, the alert module 230 can control passenger cabin lights, display screens, augmented reality displays/HUDs, haptics within a seat, steering wheel or other interface, audio systems, and so on. Thus, the alert module 230 can use an individual modality or a combination of modalities to deliver the alert. Moreover, the alert itself may take different forms, such as a simple indicator (e.g., flashing light, noise, haptic vibration) or a more complex indicator that includes explicit information, such as a direction from which the emergency vehicle is approaching, a location of the emergency vehicle, a type of the emergency vehicle, an estimated time until arrival of the emergency vehicle, and so on. Thus, the alert module 230 is able to leverage the different modalities in different ways in order to present the information. That is, the alert module 230 can use a display to simply display an alert indicator or message but can also use the display to display a map that specifies a location of the emergency vehicle and a path/route of the emergency vehicle when available. In this way, the detection system 170 is able to receive the alert signal and improve the awareness of a user by selectively providing alerts, thereby facilitating safety of both the user and the emergency vehicle.

Figure 4:
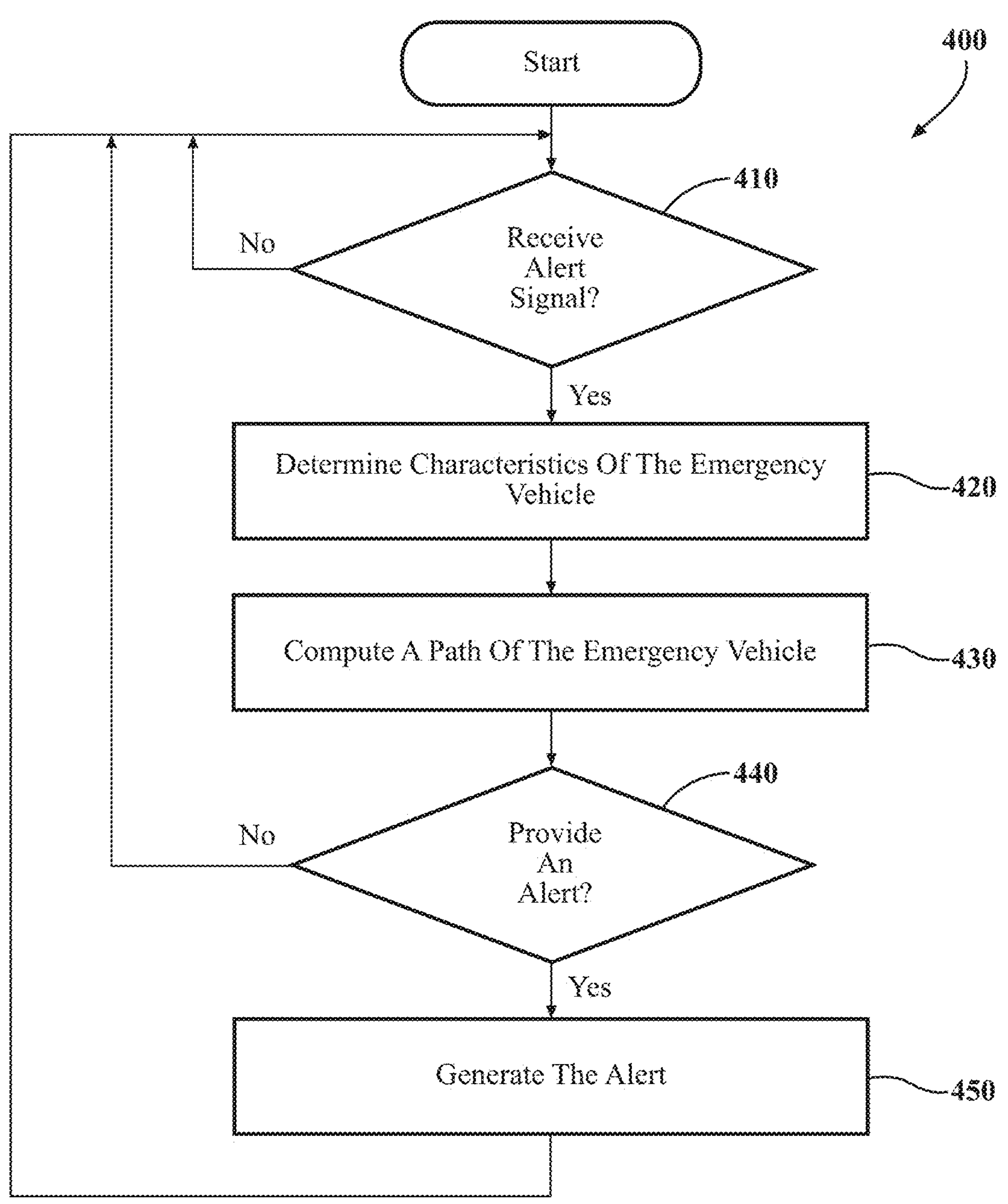
FIG. 4 illustrates one embodiment of a method associated with generating alerts for emergency vehicles.

Additional aspects of improving alerts for emergency vehicles will be discussed in relation to FIG. 4. FIG. 4 illustrates a method 400 associated with selectively generating alerts for emergency vehicles. Method 400 will be discussed from the perspective of the detection system 170 of FIG. 1. While method 400 is discussed in combination with the detection system 170, it should be appreciated that the method 400 is not limited to being implemented within the detection system 170 but is instead one example of a system that may implement the method 400.

At 410, the detection module 220 monitors for an alert signal. In general, the detection module 220 checks a buffer or other construct at a defined interval to determine whether an alert signal has been received. Alternatively, the detection module 220 monitors for the alert signal according to a program interrupt that initiates the detection module 220 to analyze the received signal. While examples are provided about how the detection module 220 may monitor for the alert signal, it should be appreciated that the examples are for illustrative purposes and are not limiting.

The detection module 220, upon sensing the arrival of a signal, proceeds with identifying whether the wireless communication from a nearby device is an alert signal from an emergency vehicle. As previously outlined, the process of identifying the alert signal can include validating one or more aspects about the signal, such as a source identifier, a digital certificate, and so on. In any case, once the detection module 220 receives and identifies the alert signal, processing continues with determining characteristics, as described at 420. Otherwise, the detection module 220 continues to monitor for the alert signal. It should be appreciated that while the method 400 is discussed as a discrete serial process, in various arrangements, the detection module 220 may continue to monitor for a subsequent alert signal even after detecting a current signal and proceeding with subsequent actions. Thus, the method 400 may execute multiple instances of the noted functions in parallel.

At 420, the detection module 220 determines one or more characteristics of the emergency vehicle (i.e., the nearby vehicle) from at least the alert signal. The alert signal includes various intrinsic characteristics about the emergency vehicle as well as explicit information in the form of a payload. The payload may indicate particular characteristics, including a type of the nearby vehicle, a location of the nearby vehicle, and a destination of the nearby vehicle, and so on. In further approaches, the payload may specify an explicit route, a purpose of the emergency (e.g., fire, rescue, police chase, etc.), dynamics of the vehicle (e.g., current speed and heading), and other information. The intrinsic information available from the alert signal includes a signal strength that may be tracked over multiple iterations of the signal to identify if the emergency vehicle is approaching, staying the same distance, or moving away. Thus, the information that is available via the alert signal can be basic or more complex, depending on the implementation.

In one or more configurations, at 420, the detection module 220 also collects the sensor data 250 using, for example, a microphone, a camera, and/or other sensors. Accordingly, the detection module 220 acquires sensor data 250 from at least one sensor of the vehicle 100 or other device in which the detection system 170 is implemented. In one embodiment, the detection module 220 acquires the sensor data 250 about a surrounding environment of the vehicle 100. As previously noted, the detection module 220, in one or more implementations, iteratively acquires the sensor data 250 from one or more sensors of the sensor system 120 to which the detection system 170 is communicatively coupled. The sensor data 250 includes observations of a surrounding environment of the subject vehicle 100, including regions behind, extending laterally outward from the vehicle 100, and forward of the vehicle 100. As noted previously, the detection module 220 acquires the sensor data 250 and may fuse observations from different sensors together in order to provide comprehensive information about the surrounding environment. In this way, the detection system 170 is able to subsequently determine aspects about the emergency vehicle, such as a location, path, etc.

At 430, the alert module 230 computes a path of the emergency vehicle according to the acquired information (e.g., the sensor data 250 and the alert data 260) that defines the characteristics. Initially, the alert module 230, in at least on approach, localizes the emergency vehicle. Once a location is known, whether relative or absolute, the alert module 230 can then compute the path. In various arrangements, the alert module 230 uses a machine learning algorithm (e.g., a deep neural network, such as a transformer network) to process the acquired information into the path. In other approaches, the alert module 230 instead uses a heuristic-based algorithm to compute the path. It should be appreciated that while the acquired information is described as the primary input to the computation of the path, the alert module 230 may retrieve other information available from secondary sources, such as weather, traffic, and so on. The additional information may facilitate further accuracy in the computation of the path, such as delays due to road conditions.

The alert module 230 then uses the path to identify a likelihood of the path intersecting or approaching the vehicle 100. Broadly, the determination about the proximity as defined by the intersection/approach to the vehicle 100 embodies whether the emergency vehicle will affect the movements and/or safety of the vehicle 100 or other road user that is using the detection system 170. Thus, the alert module 230 considers a distance of the path to the vehicle 100 at a closest point of approach and a structure of a roadway on which vehicles are located. As previously noted, the determination about whether the vehicles are on the same roadway or intersecting roadways directly influences whether the alert would be relevant to the vehicle 100 or not while the approach distance of the path further refines this determination.

At 440, the alert module 230 determines whether to provide an alert. In one or more arrangements, the alert module 230 selectively generates the alert according to whether the emergency vehicle satisfies (e.g., meets or exceeds) an approach threshold. The approach threshold indicates whether the emergency vehicle will have an effect on the movement of the electronic device in the environment. As noted, the approach threshold defines a distance and a condition for generating the alert. The condition is whether the vehicles are actually on connected roadways and a manner in which the emergency vehicle is approaching the vehicle 100. The manner of approach (e.g., from behind, from a forward direction on the opposite side of a road, from an intersecting road, etc.) defines the distance itself of the approach threshold. As outlined previously, the distance for approaching from behind may be closer than if approaching via an intersecting roadway. In either case, the alert module 230 uses the approach threshold and the computed path to determine the proximity of the approach. If the alert module 230 determines that the path does not satisfy the approach threshold, then the alert module 230 does not issue an alert and the detection system 170 continues monitoring. However, if the alert module 230 does determine that the path satisfies (e.g., meets or exceeds the distance) the approach threshold, then the alert module 230 proceeds to generate the alert.

At 450, the alert module generates the alert. As previously specified, the alert may take many different forms depending on the available modalities for providing the alert. As an example, the alert module 230 may generate the alert as a visual indicator within a display, an audible indicator, and/or a haptic indicator. Moreover, the information included therein may vary but can include a direction from which the emergency vehicle is approaching, a current location of the emergency vehicle, a type of the nearby vehicle, an estimated time of arrival, and other available information. Of course, in a separate implementation, the alert module 230 may simply alert about the presence of the emergency vehicle without specific information.

Additionally, it should be appreciated that the detection system 170 from FIG. 1 can be configured in various arrangements with separate integrated circuits and/or electronic chips. In such embodiments, the detection module 220 is embodied as a separate integrated circuit. Additionally, the alert module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the detection system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/ data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An “input system” includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An “output system” includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1; however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the detection system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the detection system 170, and/or the assistance system 160 may control some or all of these vehicle systems 150 and, thus, may be partially or fully autonomous.

The processor(s) 110, the detection system 170, and/or the assistance system 160 can be operatively connected to communicate with the various vehicle systems 150 and/or individual components thereof. For example, returning to FIG. 1, the processor(s) 110, the detection system 170, and/or the assistance system 160 can be in communication to send and/or receive information from the various vehicle systems 150 to control the movement, speed, maneuvering, heading, direction, etc. of the vehicle 100. The processor(s) 110, the detection system 170, and/or the assistance system 160 may control some or all of these vehicle systems 150.

The processor(s) 110, the detection system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the detection system 170, and/or the assistance system 160 can control the direction and/or speed of the vehicle 100. The processor(s) 110, the detection system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the detection system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more assistance system(s) 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system, comprising:
one or more processors;
a memory communicably coupled to the one or more processors and storing:
a detection module including instructions that, when executed by the one or more processors, cause the one or more processors to:
detect, using an electronic device that includes a radio receiver, an alert signal by receiving a wireless communication from an environment of the electronic device, and identifying that the wireless communication is from a vehicle in the environment of the electronic device, and
responsive to detecting the alert signal from the vehicle, determine one or more characteristics of the vehicle from at least the alert signal; and
an alert module including instructions that when executed by the one or more processors cause the one or more processors to:
compute a path of the vehicle according to at least the one or more characteristics,
determine a distance between the path of the vehicle and the electronic device at a closest point of approach, wherein the closest point of approach is a point on the path that is closest to the electronic device,
identify a likelihood of the path of the vehicle intersecting with the electronic device based on a comparison between the distance at the closest point of approach and an approach threshold, and
selectively generate, using the electronic device, an alert according to when the distance at the closest point of approach satisfies the approach threshold, thereby indicating a likelihood that the vehicle will have an effect on movement of the electronic device in a surrounding environment,
wherein the likelihood that the vehicle will have an effect on movement of the electronic device quantifies a likelihood that the path of the vehicle will at least one of: delay the movement of the electronic device, change a trajectory of the movement of the electronic device, or stop the movement of the electronic device.

2. The detection system of claim 1, wherein the detection module includes instructions to detect the alert including instructions to receive and identify the wireless communication from the vehicle that includes a payload specifying at least the one or more characteristics, and
wherein the one or more characteristics include an indicator specifying a type of the vehicle, a location of the vehicle, and a destination of the vehicle, and wherein the type includes one of: an ambulance, a police vehicle, a fire vehicle, and a military vehicle.

3. The detection system of claim 1, wherein the detection module further includes instructions to:
collect sensor data about the environment around the electronic device in which the electronic device is located, the sensor data including at least perceptions about the vehicle.

4. The detection system of claim 3, wherein the detection module includes instructions to determine the one or more characteristics including instructions to localize the vehicle according to at least one of the sensor data and the alert signal, and
wherein the sensor data includes perceptions from one or more of a microphone, and a camera.

5. The detection system of claim 1, wherein the alert module includes instructions to provide the alert including instructions to determine the likelihood according to at least the distance at the closest point of approach and a structure of a roadway on which the vehicle and the electronic device are located while accounting for environmental conditions, including weather and traffic.

6. The detection system of claim 1, wherein the alert module includes instructions to provide the alert including instructions to generate the alert as one or more of: a visual indicator within a display associated with the electronic device, an audible indicator, and a haptic indicator, and wherein the alert indicates one or more of a direction from which the vehicle is approaching the electronic device, a location of the vehicle, a type of the vehicle, and a presence of the vehicle.

7. The detection system of claim 1, wherein the electronic device is one of: a mobile phone and a controller integrated with a detecting vehicle.

8. The detection system of claim 1, wherein the detection module includes instructions to iteratively detect the alert signal over a defined interval, and based on a change in signal strength of the alert signal over the defined interval, determine a movement of the vehicle with respect to the electronic device.

9. The detection system of claim 1, wherein the alert module includes instructions that when executed by the one or more processors, cause the one or more processors to:

determine, based on the path of the vehicle, whether the vehicle is associated with the electronic device, wherein the vehicle is associated with the electronic device in a state in which the road of the path of the vehicle is directly connected with traffic of a road on which the electronic device is located, identify the likelihood of the path of the vehicle intersecting with the electronic device based on whether the vehicle is associated with the electronic device and based on the comparison between the distance at the closest point of approach and the approach threshold, and selectively generate, using the electronic device, the alert only when the distance at the closest point of approach satisfies the approach threshold and the vehicle is associated with the electronic device.

10. A non-transitory computer-readable medium storing instructions that, when executed by one or more processors, cause the one or more processors to:

detect, using an electronic device that includes a radio receiver, an alert signal by receiving a wireless communication from an environment of the electronic device, and identifying that the wireless communication is from a vehicle in the environment of the electronic device;

responsive to detecting the alert signal from the vehicle, determine one or more characteristics of the vehicle from at least the alert signal;

compute a path of the vehicle according to at least the one or more characteristics;

determine a distance between the path of the vehicle and the electronic device at a closest point of approach, wherein the closest point of approach is a point on the path that is closest to the electronic device;

identify a likelihood of the path of the vehicle intersecting with the electronic device based on a comparison between the distance at the closest point of approach and an approach threshold; and selectively generate, using the electronic device, an alert according to when the distance at the closest point of approach satisfies the approach threshold, thereby indicating a likelihood that the vehicle will have an effect on movement of the electronic device in a surrounding environment, wherein the likelihood that the vehicle will have an effect on movement of the electronic device quantifies a likelihood that the path of the vehicle will at least one of: delay the movement of the electronic device, change a trajectory of the movement of the electronic device, or stop the movement of the electronic device.

11. The non-transitory computer-readable medium of claim 10, wherein the instructions to detect the alert include instructions to receive and identify the wireless communication from the vehicle that includes a payload specifying at least the one or more characteristics, and wherein the one or more characteristics include an indicator specifying a type of the vehicle, a location of the vehicle, and a destination of the vehicle, and wherein the type includes one of: an ambulance, a police vehicle, a fire vehicle, and a military vehicle.

12. The non-transitory computer-readable medium of claim 10, wherein the instructions further include instructions to:

collect sensor data about the environment around the electronic device in which the electronic device is located, the sensor data including at least perceptions about the vehicle.

13. The non-transitory computer-readable medium of claim 12, wherein the instructions to determine the one or more characteristics include instructions to localize the vehicle according to at least one of the sensor data and the alert signal, and wherein the sensor data includes perceptions from one or more of a microphone, and a camera.

14. A method, comprising:

detecting an alert signal using an electronic device that includes a radio receiver, wherein the detecting includes receiving a wireless communication from an environment of the electronic device, and identifying that the wireless communication is from a vehicle in the environment of the electronic device;

responsive to the detecting the alert signal from the vehicle, determining one or more characteristics of the vehicle from at least the alert signal;

computing a path of the vehicle according to at least the one or more characteristics;

determining a distance between the path of the vehicle and the electronic device at a closest point of approach, wherein the closest point of approach is a point on the path that is closest to the electronic device;

identifying a likelihood of the path of the vehicle intersecting with the electronic device based on a comparison between the distance at the closest point of approach and an approach threshold; and selectively generating, using the electronic device, an alert according to when the distance at the closest point of approach satisfies the approach threshold, thereby indicating a likelihood that the vehicle will have an effect on movement of the electronic device in a surrounding environment, wherein the likelihood that the vehicle will have an effect on movement of the electronic device quantifies a likelihood that the path of the vehicle will at least one of: delay the movement of the electronic device, change a trajectory of the movement of the electronic device, or stop the movement of the electronic device.

15. The method of claim 14, wherein detecting the alert further includes receiving and identifying the wireless communication from the vehicle that includes a payload specifying at least the one or more characteristics, and wherein the one or more characteristics include an indicator specifying a type of the vehicle, a location of the vehicle, and a destination of the vehicle, and wherein the type includes one of: an ambulance, a police vehicle, a fire vehicle, and a military vehicle.

16. The method of claim 14, further comprising:

collecting sensor data about the environment around the electronic device in which the electronic device is located, the sensor data including at least perceptions about the vehicle.

17. The method of claim 16, wherein determining the one or more characteristics includes localizing the vehicle according to at least one of the sensor data and the alert signal, and wherein the sensor data includes perceptions from one or more of a microphone, and a camera.

18. The method of claim 14, wherein providing the alert includes determining the likelihood according to at least the distance at the closest point of approach and a structure of a roadway on which the vehicle and the electronic device are located while accounting for environmental conditions, including weather and traffic.

19. The method of claim 14, wherein providing the alert includes generating the alert as one or more of: a visual indicator within a display associated with the electronic device, an audible indicator, and a haptic indicator, and wherein the alert indicates one or more of a direction from which the vehicle is approaching the electronic device, a location of the vehicle, a type of the vehicle, and a presence of the vehicle.

* * * * *